(No Model.)

H. R. VAN EPS.
FENCE.

No. 306,446. Patented Oct. 14, 1884.

Witnesses:

H. N. Wells.

Richd A. Goldsbrough.

Inventor,

Henry R. Van Eps, per A. B. Upham,

His Attorney.

UNITED STATES PATENT OFFICE.

HENRY R. VAN EPS, OF PEORIA, ILLINOIS.

FENCE.

SPECIFICATION forming part of Letters Patent No. 306,446, dated October 14, 1884.

Application filed December 31, 1883. (No model.)

*To all whom it may concern:*

Be it known that I, HENRY R. VAN EPS, of Peoria, in the county of Peoria, in the State of Illinois, have invented an Improved Fence; and I do hereby declare that the following is a full, clear, and exact description thereof, reference being had to the annexed drawings, making a part of this specification, in which like letters of reference refer to like parts, and in which—

Figure 1:
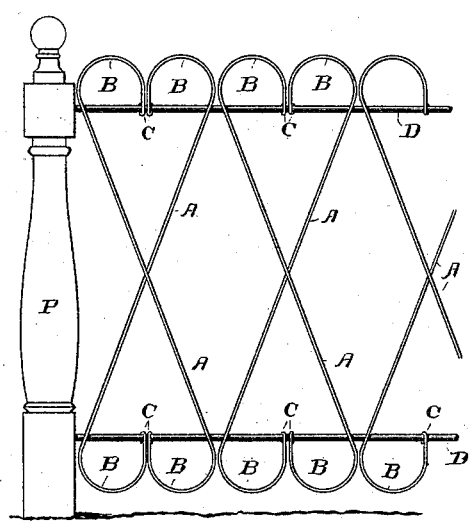
Figure 2:
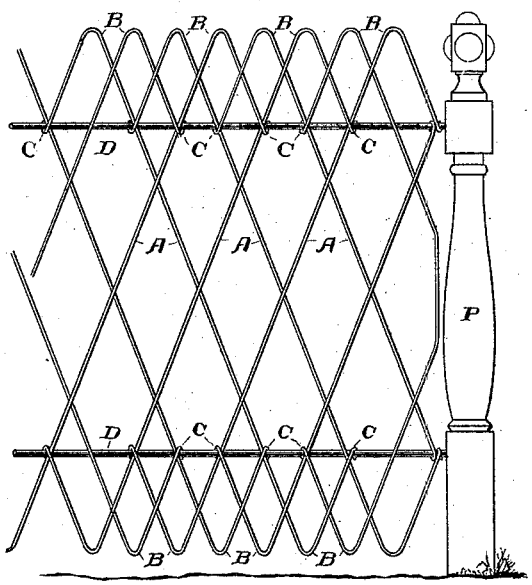

Figure 1 represents an elevation of the same, and Fig. 2 a modification.

The object of this invention is the construction of a fence which shall be entirely or with the exception of the posts formed from metal rods.

My invention for this purpose consists, essentially, of two horizontal rods extending from post to post, and having smaller metal rods running from one to the other, said rods being looped above and below the two horizontal rods to give an ornamental appearance thereto, and also to serve as guards or pickets.

In the drawings, P represents the fence-post at one end of a section of fence. The metal rods D D' extend from post to post, (one being near the upper ends of said posts and the other near their bases,) and are held in place by being inserted into openings in said posts. The slenderer metal rods A are fastened to said rods D by having their ends $c$ bent snug about them. The main body of each rod A extends in a straight line from rod D to rod D', but at oblique angles thereto. Between the points where the rods A cross the rods D D' and their secured ends $c$ said rods A are bent into loops B. In Fig. 1 the loops B are shown as bent into semicircular forms, the ends $c$ of the rods A being contiguous in each pair, so that said rods A shall form the outline of a conventionalized heart. In Fig. 2 the loops B are formed relatively to the angles which the rods A make with the rods D on the side opposite to those shown in Fig. 1—that is, a rod A which slants at its upper extremity toward the right has its loop B bent over toward the left in Fig. 1, while in Fig. 2 it is toward the right. The loops B in Fig. 2 are also approximately V-shaped, and the ends $c$ clasp not only the rods D, but also the rods A, to aid in retaining the same in place. I do not always, however, bend the ends $c$ about both the rods A and D, but often have said ends clasp the rods D alone.

By having the loops B bent up over the upper rod, D, and down below the lower rod, D', a neat and ornamental appearance is given to the fence, animals are prevented from crawling beneath the same, and mischievous individuals are deterred from sitting upon or climbing over my fence.

The construction shown in Fig. 2 enables the rods A to be nearer together than they are in the other form, and thus serves to hinder the passage through of much smaller animals than would find any difficulty in going between the adjacent rods A of the fence represented in Fig. 1.

The main reason, besides that of appearance, for having the rods A run angularly from rods D to D' is to prevent sagging of the central portion of the fence.

The rods D D' and the rods A, fastened thereto at their ends $c$, but crossing each other at acute angles, form in fact a skeleton truss.

This making the fence thus centrally self-supporting is a very important point, for if the rods D were made inflexible enough to sustain the entire weight it would add greatly to the expense of the fence.

I am aware that fences have previously been constructed in which were oblique intersecting metal rods secured to two horizontal rods and surmounted by loops, and I do not therefore broadly claim the same; but

What I claim as my invention, and for which I desire Letters Patent, is as follows, to wit:

The combination, in a fence of the kind herein described, of the two horizontal rods D D' and the oblique metal rods A, straight throughout their entire lengths, except near their ends, where they are formed into the loops B, and at their ends $c$, which tightly clasp said rods D D', as and for the purpose set forth.

In testimony that I claim the foregoing invention I have hereunto set my hand this 29th day of December, 1883.

HENRY R. VAN EPS.

Witnesses:
J. M. MORSE,
B. M. ROSS.